Figure 1:
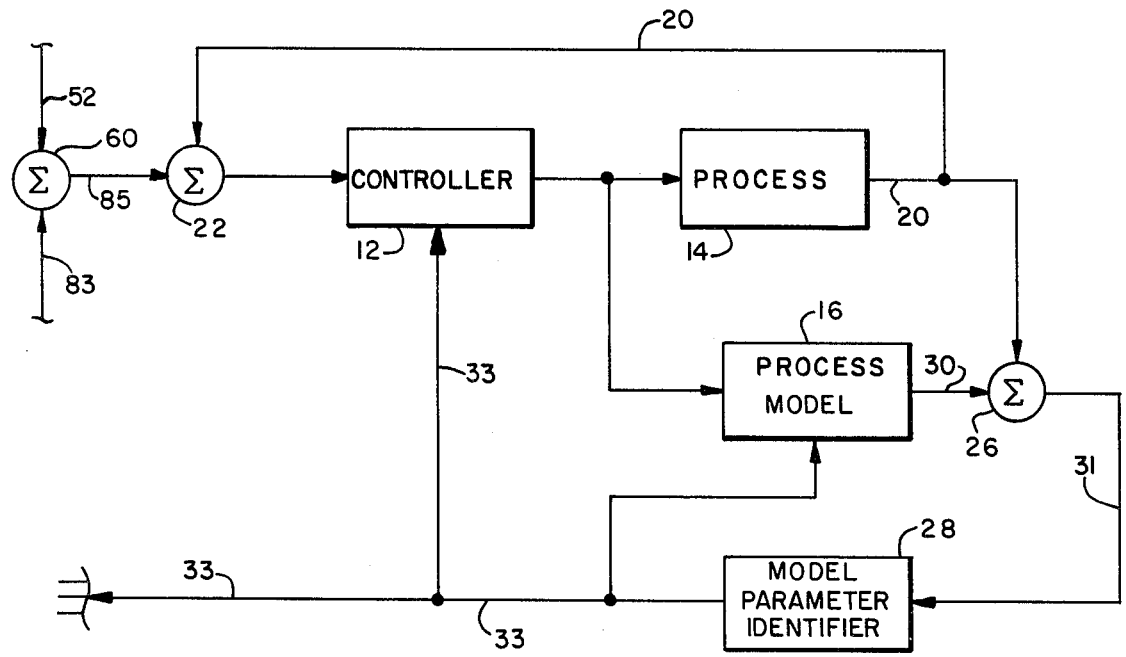

United States Patent [19]

Anderson

[11] 4,368,510
[45] Jan. 11, 1983

[54] AUTOMATIC IDENTIFICATION SYSTEM FOR SELF TUNING PROCESS CONTROLLER

[75] Inventor: Paul Anderson, Green Lane, Pa.

[73] Assignee: Leeds & Northrup Company, North Wales, Pa.

[21] Appl. No.: 198,801

[22] Filed: Oct. 20, 1980

[51] Int. Cl.³ .................. G05B 13/04; G05B 17/02
[52] U.S. Cl. ............................ 364/151; 318/561; 364/157; 364/158; 364/162
[58] Field of Search ............. 364/150, 151, 155, 158, 364/159, 157, 160, 162; 318/561, 609, 610

[56] References Cited

U.S. PATENT DOCUMENTS

| | | | |
|---|---|---|---|
| 3,221,230 | 11/1965 | Osburn | 364/158 X |
| 3,534,400 | 10/1970 | Dahlin | 364/158 |
| 3,758,762 | 9/1973 | Littman et al. | 364/157 X |
| 3,767,900 | 10/1973 | Chao et al. | 364/151 |
| 3,876,871 | 4/1975 | Sinner | 364/151 |
| 4,054,780 | 10/1977 | Bartley et al. | 364/151 |
| 4,214,300 | 7/1980 | Barlow et al. | 364/157 |

OTHER PUBLICATIONS

Dahlin–"Designing and Tuning Digital Controllers'–Instruments and Control Systems, Jun. 1968–vol. 2, No. 6,–pp. 77-83.
Touchstone et al.–"Adaptive Control Through Instrumental-Variable Estimation of Discrete Model Parameters"–Proc. of ISA/77–Anaheim, CA–May 2-5, 1977–pp. 57-64.

*Primary Examiner*—Joseph F. Ruggiero
*Attorney, Agent, or Firm*—Stuart E. Beck

[57] ABSTRACT

A process for automatically identifying the parameters of a controller which controls a process and a process model which includes changing alternately the set point for the process by a predetermined value above and below the desired set point of the process which is continued until the parameters of the process model describe the process.

The apparatus includes means for creating a cycle that has a plurality of steps, means for comparing a proportional amount of a set point change with a corresponding value of the process during one of the cycles steps during which the parameters are identified, means for repeating the cycle until the change in the values of the parameters between adjacent cycle is less than a predetermined amount, and means for terminating the cycle repetition if the parameter change between adjacent cycles is less than the predetermined amount.

12 Claims, 4 Drawing Figures

AUTOMATIC IDENTIFICATION SYSTEM FOR SELF TUNING PROCESS CONTROLLER

In automatic process control systems of the type that use P-I-D type controllers and process models the operator must adjust three types of controller action to achieve the desired control performance.

The types of controller action that the operator must monitor are proportional band, rate change control and reset control.

This is accomplished by making a step change in the set point of the process and observing the response of the process variable which is being controlled. The operator then readjusts the controller based on the response which is observed.

Manual adjustment of the set point in order to obtain control over the process is undesirable because of the unreliability of the operator and because of the difficulty in achieving precise control.

It would be desirable to have a method and apparatus for automatically determining the parameters of the model so that these parameters could be applied to the controller for controlling the process.

With the foregoing in mind, the invention relates generally to a method for tuning a controller of the P-I-D type which comprises the steps of creating a cycle which includes the steps of comparing a signal which corresponds to the state of the process variable which is being monitored, and a signal that corresponds to the sum of a proportional change in set point with the signal corresponding to the state of the process variable being monitored for a previous interval. A time interval is determined by monitoring the time required for the process to make a change that corresponds to the proportional change in set point. The set point change is alternately added to, omitted from and subtracted from the value of the signal corresponding to process variable for said time interval. The resulting signal is applied to the controller.

The controller controls the process and the process model, as is well known in the art, which in turn causes the parameters of the model to continuously change. When the change in parameters between adjacent cycles falls below a certain value, the sequencer is disabled.

The apparatus generally included means for transmitting a signal corresponding to a state of the process variable and a change in the set point to the apparatus which combines these two signals to establish a reference input which is compared to said process variable signal by a comparator. The output of the comparator is transmitted to a means for controlling a cycle. Additionally, the apparatus includes a decoder which is operative to add, ignore or subtract a signal corresponding to the set point change with respect to the signal corresponding to the signal process variable at the start of the cycle. Means are provided for detecting changes in the parameters of the process model from cycle to cycle of the sequencer. Means are also provided for disabling the sequencer when the change in parameters from cycle to cycle is less than a predetermined value.

The invention can best be understood by referring to the accompanying drawing where a presently preferred form thereof is illustrated and wherein like numerals throughout the several views indicate the parts and wherein FIG. 1 is a schematic drawing of an automatic process control system of either the P-I-D or discrete time type.

Figure 2:
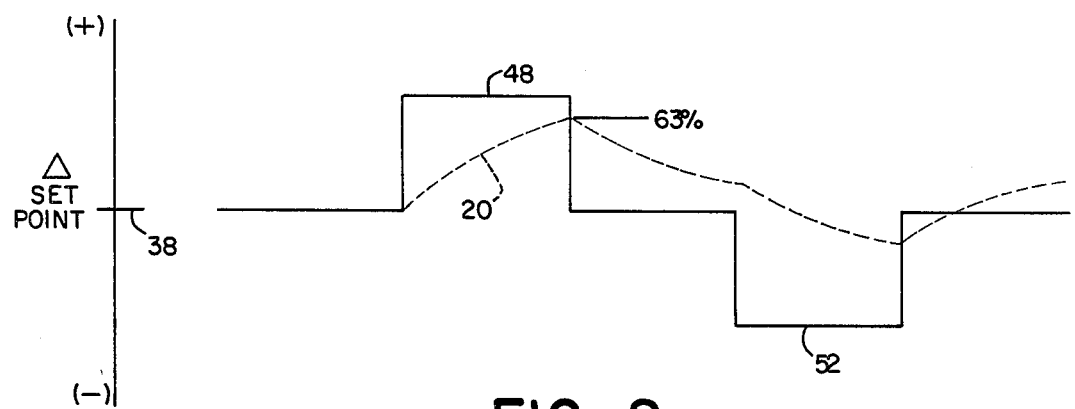
Figure 3:
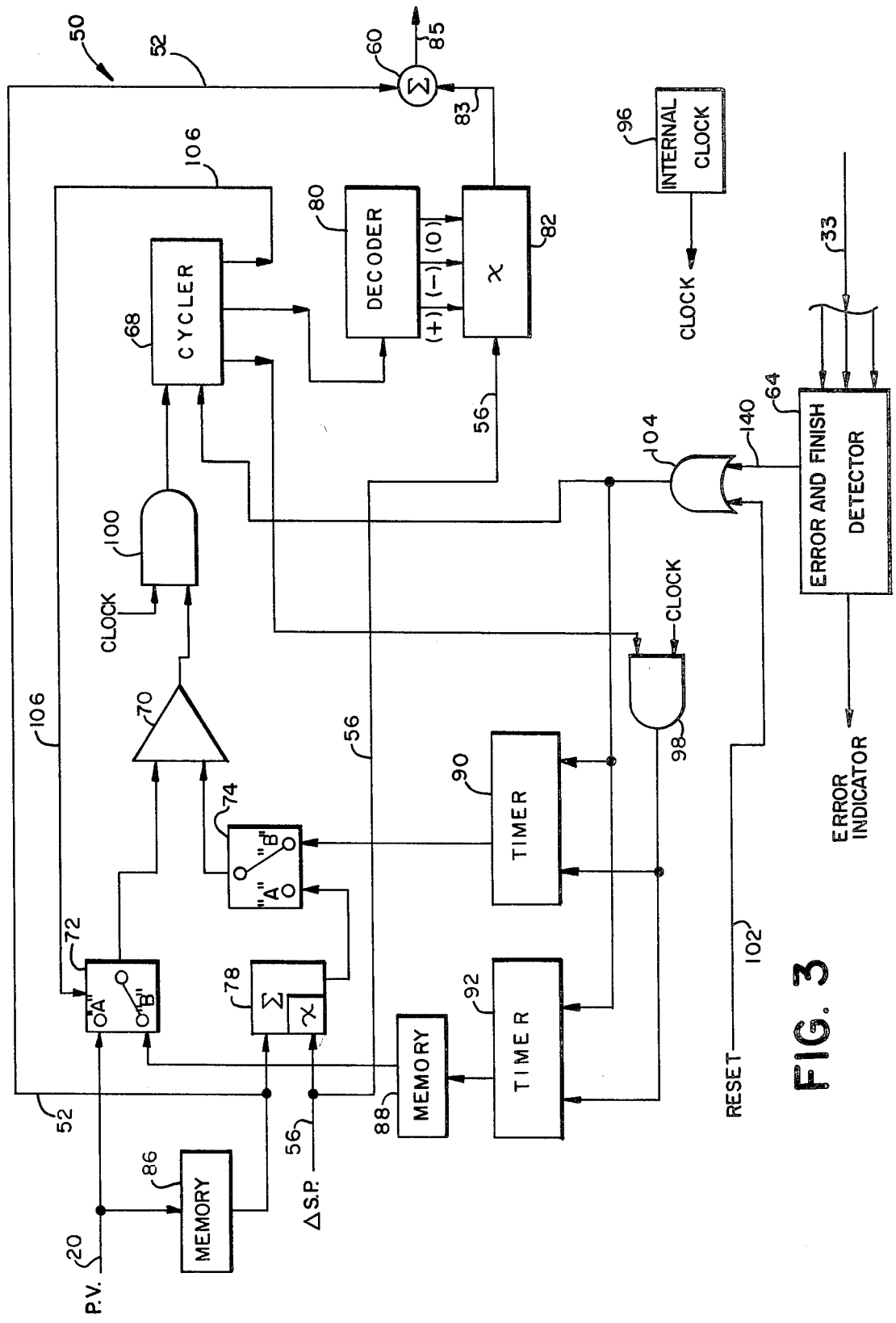
Figure 4:
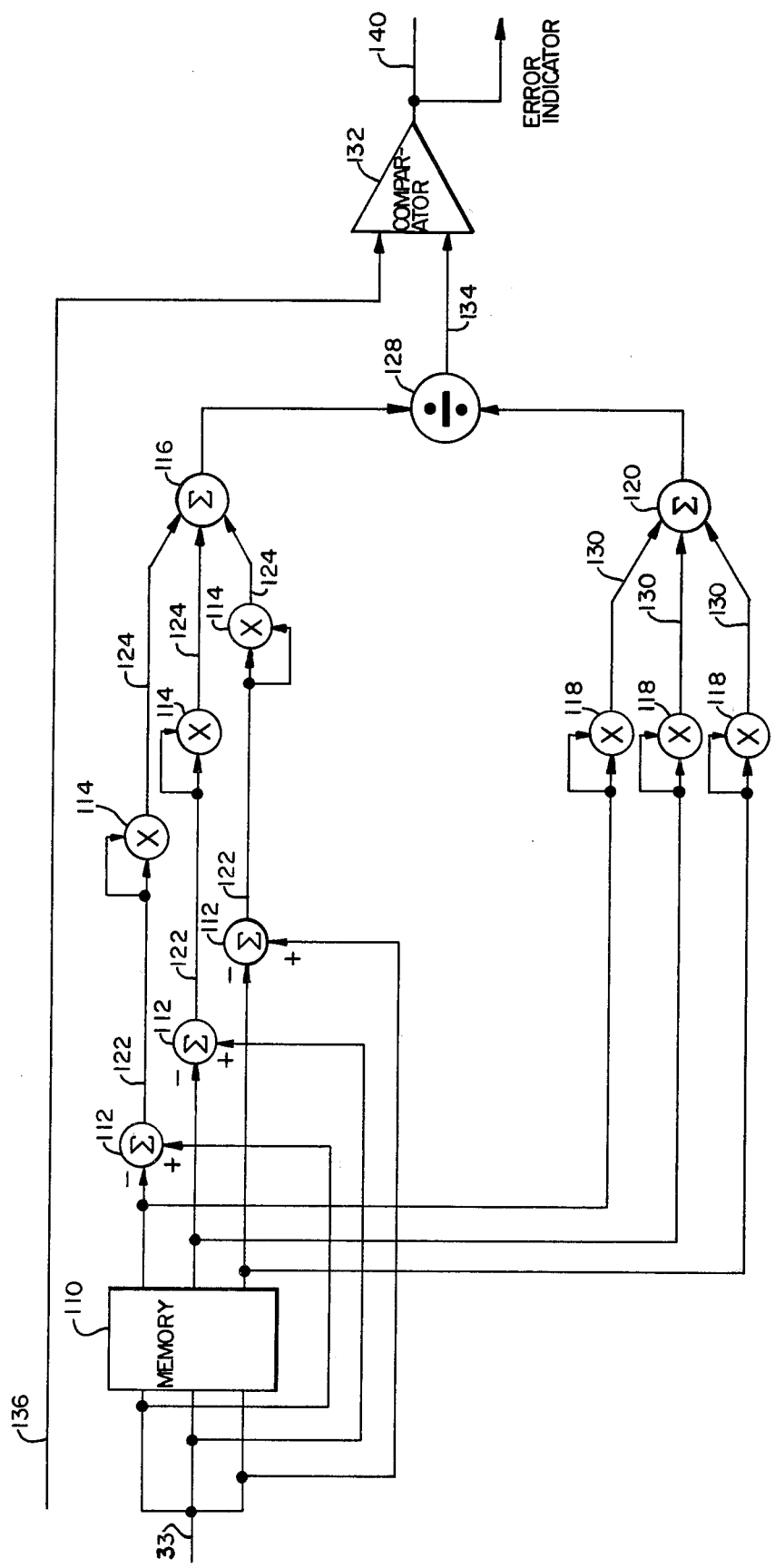

FIG. 2 is a sketch showing the relationship between the set point step changes and the process variable response during tuning, FIG. 3 is a schematic drawing of the automatic sequencer, and FIG. 4 is a schematic drawing of the Error and Finish Detector in the automatic sequencer of FIG. 3.

Referring now to the drawings, FIG. 1 illustrates a typical automatic control system for a process variable. The variable could be the temperature, pressure, viscosity or the like of the process. The system includes a controller 12 which provides input signals to process 14 and process model 16. An output signal 20 that corresponds to the present state of the process is applied to a summer 22.

If a discrete time controller is not used, the discrete time parameter $a_1$, $a_2$, $b_1$, $b_2$ must be changed to P-I-D controller parameters in order to control the process.

In order to begin the control of the process it is necessary to initiate changes in the process and in the process model since only by comparing how the process model changes with respect to change in the process can the parameters of the process model be identified. This was pointed out by A. T. Touchstone and A. B. Corripio in *Adaptive Control Through Instrumental—Variable Estimation of Discrete Model Parameters*, proceeding of ISA/77, Anaheim, CA May 2–5, 1977, pp. 57–64 and E. B. Dahlin in *Designing and Tuning Digital Controllers in Instruments and Control Systems*, Vol. 42, No. 6 June 1968, pp. 78–83; who show that by making step changes in the set point of the process the input to the process model is changed and its parameters can be determined.

The output signal 30 of the process model has the form $$Y_n = a_1 X_{n-1} + a_2 X_{n-2} - b_1 Y_{n-1} - b_2 Y_{n-2}$$

wherein $Y_n$ = the output signal from said process model at the time n;

$Y_{n-1} = Y_n$ for the time preceeding the time n;

$Y_{n-2} = Y_n$ for the time preceeding the time n−1, $X_{n-1}$ = the output signal from said controller for the time preceeding the time n; and $X_{n-2}$ = the output signal from said controller for the time preceeding the time n−1; and $a_1$, $a_2$, $b_1$, $b_2$ are parameters which when identified will enable the process model 16 to have the same characteristic as the process 14.

To the extent that the process model 16 does not accurately reflect the process, an error signal 31 that is developed at summer 26 is applied to a model parameter identifier 28. The model parameter identifier 28 solves the process model output signal equation in accordance with a system which comprises a recursive least squares regression to determine the values of $a_1$, $a_2$, $b_1$ and $b_2$ which can be converted to P-I-D form if desired. A number of techniques are known for achieving this conversion. One such technique is disclosed in copending application Ser. No. 198,804 which was filed on Oct. 20, 1980 by Samuel A. Arcara and Paul P. Anderson and which is entitled Self Tuning of P-I-D Controller by Conversion of Descrete Time Model Identification Parameters.

The manner in which this is accomplished can best be explained by referring to FIG. 2 wherein the horizontal line represents the desired set point of the process and the step curve represents changes about the desired set point.

The desired set point 38 (which may be temperature, for example) becomes a reference level. The set point is changed by the operator to a new level. The value of the set point may be arbitrarily selected by the operator provided that it is reasonable for the variable being monitored.

When signal 20 which corresponds to the state of the process variable being monitored indicates that the process variable is as a predetermined value (usually 63% of the set point change) i.e., the closed loop response time, the set point is returned to the reference level. The set point is held at the reference level for a period corresponding to the closed loop response time. At the end of the time interval 48, the set point change is subtracted from the reference level to define a new set point 52. This change is held for the closed loop response time. Then the set point is returned to the reference level 38.

As the set point is changed the process 14 and the process model 16 will vary accordingly. The variations in the state of the process variable results in an output signal from the process which is applied to a summer 26. A signal corresponding to the input to the process model is applied from the controller 12. The output signal 30 of the process model is combined with the output signal from process at summer 26 to create a signal 31 which is applied to the means for identifying the model identification parameters $a_1$, $a_2$, $b_1$, and $b_2$. The model parameter identifier 28 applies these parameters by way of signal 33 to the controller 12. These parameters are changed until the process model 16 accurately describes the process 14.

The manual process just described is accomplished by the automatic sequencer 50 which is illustrated in FIG. 3.

The sequencer 50 automatically makes the set point changes illustrated in FIG. 2 and the changes in process variable illustrated in that figure until the parameters for the controller are identified.

Referring now to FIG. 3 where the automatic sequencer 50 is described in detail, it can be seen that the sequencer is responsive to the signal 20 that corresponds to the state of the process variable and the set point change 56 which is selected by the operator.

The sequencer selectively adds, ignores, subtracts and ignores the set point change 56 to the signal corresponding to the state of the process variable at the beginning of the cycle, i.e., signal 52, this is done at summer 60 and applies that signal to summer 22.

The cycle is repeated until error and finish detector 64 determines that the values of the controller parameters in adjacent cycles is less than the predetermined value. Typically, the sequencer will continue to operate until the values of those parameters are brought within about 1% from cycle to cycle. However, the desired value could be varied to any suitable number.

The automatic identification sequencer 50 includes a cycler 68, a comparator 70, switches 72 and 74, adder and multiplier 78, decoder 80 and multiplier 82.

The sequencer also includes a process variable memory 86, a timer memory 88 and two timers 90 and 92.

An internal clock 96 cooperates with the AND gates 98 and 100 to apply pulses to the timers 90 and 92 and the cycler 68.

Initially, the automatic identification sequencer 50 is manually reset through reset line 102 which energizes the cycler 68 through OR gate 104. The signal also resets timer 92. In this state the cycler 68 by way of line 106 enables switch throws of switches 72 and 74, which are ganged, to move to switch contacts "A". This enables the process variable signal 20 to enter the comparator as an input.

It also enables the selected set point change 56 to be multiplied by a predetermined constant, normally 63%, and added to the value of signal 20 from the beginning of the cycle, i.e., signal 52. This occurs in summer-multiplier 78; the output of which is also applied to comparator 70.

Simultaneously, the set point change is applied to multiplier 82.

The comparator input corresponding to the remembered process variable 52 plus the predetermined percentage of the set point change becomes the reference value for the rest of the cycle of the sequencer.

At a predetermined time the cycler 68 is transferred to a second state in which it enables the decoder 80 to generate a "plus" output which causes the output of the multiplier 82 to have a positive value which is equal to the level of set point change 56. The combined output signal 85 from summer 60 is applied to summer 22 for application to the controller 12 with signal 20.

The positive value of the set point enters summer 60 and is added to the value of the process variable which is held in memory 86. At the same time timer 92 is energized to clock the interval that it takes the signal 20 that corresponds to the state of the process to reach the reference value. This time interval is stored in memory 88.

At this time the comparator 70 generates an output signal to gate 100 which when pulsed by the clock 96 enables the cycler 68 to advance to the next state. In the next state the cycler enables the decoder to change from the "plus" output to a "zero" output which when multiplied by the change in set point eliminated it, thereby bringing the set point change introduced by the sequencer down to the reference set point 38 (FIG. 2) which is the value of the signal on line 52 in FIG. 3. This state is continued for an interval which is the same as the interval that took the process variable to come up to 63% of the set point change 56. The duration of this interval is controlled by memory 88.

Additionally, the cycler 68 changes switch throws 72 and 74 to the "B" contacts whereby the accumulated time from the preceeding state becomes the reference value of the comparator. The time in the present state is the other input to the comparator. When the time in the present state equals the time in the previous state the output signal from the comparator combines with the clock pulse at AND gate 100 to enable the cycler to advance to the next state. In this state the decoder enables the multiplier to change the set point signal 83 to a negative value and adds that to the value of the remembered process variable signal 52 at summer 60; the output of which is applied to summary 22. This state is terminated as previously described by a comparison of the time in this state to the time interval stored in memory 88.

The cycler is then advanced to the next state which causes the set point change signal to summer 60 to be set to zero by means of multiplier 82 thereby causing the set point signal to have a value corresponding to signal 52 the remembered process variable from the start of the cycle.

At the end of another timed interval the comparator again pulses the cycler 68 to terminate the cycle.

At the end of the cycle, error and finished detector 64 compares the controller parameters from adjacent cycles in response to the set point changes. As long as the changes from cycle to cycle are beyond a predetermined level, it pulses the cycler 68 through OR gate 104 to reset cycler 68 to begin the process just described again. Additionally, it may provide a suitable signal indicating that it is going through the cycle again.

When error and finished detector 64 finds that the changes in the controller parameters from cycle to cycle are within an acceptable value such as, 1% for example, it disables the cycler and shuts down the automatic sequencer.

The error and finish detector 64 is best described in FIG. 4. It includes a memory 110, a number of summers 112 and multipliers 114 which correspond to the number of parameters on line 33, and a summer 116 for combining the outputs of the multiplier 114.

It also includes another set of multipliers 118. There are the same number of multipliers 118 as multipliers 114. The output of the multipliers 118 are combined on summer 120.

In operation the parameters are applied to memory 110. The memory 110 stores the parameter values for one cycle so that the output of the memory reflects the value of the parameters from the preceeding cycle.

The present values of the parameters are summed at summers 112 with the delayed values from the memory 110 to create signals 122 corresponding to their changes from the preceeding cycle.

Each of the signals 122 is multiplied by itself by multipliers 114 so that the output signals 124 from the multipliers are the squares of the differences of the parameter signals from adjacent cycles. The signals are summed in summer 116; the output of which is applied to divider 128 as a numerator.

At the same time each of the delayed parameter signals from the memory 110 are squared by multipliers 118 and their output signals 130 are applied to summer 120; the output of which is applied to divider 128 as a denominator.

The output of the divider is the proportional change in the values of the parameters from cycle to cycle. They are squared to remove negatives and given positive values that can be summed to create a single value representative of all the inputs.

The quotient 134 generated as the output of the divider 128 is applied to the comparator 132. The other input of the comparator receives a reference signal 136 which is the predetermined upper limit of the value of the quotient signal 134.

As long as the quotient signal 134 is higher than the reference signal 136 the comparator will apply an output signal 140 to OR gate 104 to reset the cycler 68 and start the identification sequence again.

It is apparent that there may be many cycles performed until the values of the controller parameter fall within the predetermined levels. On the other hand, the minimum number of cycles that can be gone through is two since it is only by having a comparison between a particular set of parameters and the parameter for the preceeding cycle that the error can be detected. The program for the sequencer is appended hereto. It is written in 6803 microprocessor assembly language which is produced by Motorola, Inc.

The main programs are:

SPDRV—which performs the functions of the sequencer.

APDST—which performs the function of error and finished detector.

The mathematical computation subroutines and data movement routines which are required by these main programs are also included.

It is apparent that while the automatic identification sequencer has been described in the context of a P-I-D controller, it can also be used in a discrete time controller. In this type of controller it would not be necessary to translate the model parameter identyfying identifiers $a_1$, $a_2$, $b_1$, and $b_2$ to P-I-D parameters.

Further, while the invention has been described with respect to one particular method and apparatus therefore, it is apparent that another method and other apparatus will be obvious to those skilled in the art and view of the foregoing description. Thus, the scope of the invention should not be learned by that description, but, rather, only by the scope of the claims appended hereto.

What is claimed is:

1. In a method for tuning a continuously tunable controller in which the controller parameters are responsive to at least one of a plurality of signal inputs so that said controller sends signals to control a process and supplies an input signal to a model of said process in which said model has parameters which are variable in accordance with the difference between the value of a signal that corresponds to the state of the process and the value of the output signal from process model, wherein signals that correspond to said model parameters are applied to the controller, and the said model parameters are identified by making step changes in the set point of the controller and permitting the process to reach a predetermined portion of the value of said step changes in the set point, the improvement comprising, providing a first signal which corresponds to the state of said process at a given time; providing a second signal which corresponds to said set point change; providing means for creating a cycle which includes the steps of adding, ignoring and subtracting said second signal from said first signal during time intervals and applying the resulting signal to said controller whereby said controller varies the input signal to the model of said process; determining the value of the output signal from said process model; and repeating said cycle until the change in the value of said output signal corresponding to at least one of said model parameters from said process model from the previous cycle to the present cycle is less than a predetermined value so that said model parameters are identified automatically.

2. The method as defined in claim 1 including the step of providing a third signal which corresponds to the sum of said first signal and said predetermined portion of said second signal; providing a fourth signal which corresponds to the state of said process a time subsequent to said given time, detecting the length of the interval that said third signal takes to become substantially equal to said fourth signal; adding said first signal to said second signal for said interval, not applying said first signal to said signal for said interval; subtracting said first signal from said second signal for said interval and not applying said first signal to said second signal for said interval.

3. The method as defined in claim 1 wherein said predetermined value is about one percent.

4. The method as defined in claim 1 wherein said change in the value of said output signal is determined by comparing the signal that corresponds to the square of the change of the value of said output signal from said given time to a subsequent time divided by a signal that corresponds to the square of said output signal at said given time.

5. The method as defined in claim 1 wherein there are a plurality of output signals and the value of each of said output signals corresponds to the value of one of said model parameters, and said change in the value of each of said model parameters is determined by comparing a signal that corresponds to the sum of the squares of the change in the value of said model parameters from said given time to a subsequent time divided by the sum of the squares of the values of said parameters at said given time.

6. In an apparatus for tuning a continuously tunable controller which controller is responsive to at least one of a plurality of signal inputs so that said controller controls a process, said apparatus including a model of said process which model has parameters which are variable in accordance with the difference between a signal that corresponds to the state of the process and an output signal from the process model and in which signals that correspond to the values of said model parameters are applied to the controller, and wherein said model parameters are identified by making step changes in the set point of the controller and permitting the process to reach a predetermined proportion of the value of said changes, the improvement comprising, means for providing a first signal which corresponds to the state of said process at a given time, means for providing a second signal which corresponds to said set point change, means for creating a cycle comprising a plurality of steps, said steps including determining the time interval for said process to reach said predetermined portion of said changes, adding, ignoring, and subtracting said second signal from said first signal during time intervals equal to said determined time interval so that the signal resulting therefrom is applied to said controller to control said process whereby the value of said model parameters change, means for repeating said cycle until the values of said model parameters change from the previous cycle less than a predetermined amount when compared to the next adjacent cycle.

7. An apparatus as defined in claim 6 including means for comparing signals, means for adding the value of said first signal to a predetermined proportion of the value of said second signal to create a third signal, means for applying said third signal to said comparing means, means for applying a fourth signal to said comparing means wherein said fourth signal corresponds to the state of said process prior to said given time, means for measuring the time interval for said fourth signal to equal said third signal, and means for remembering the length of said time interval.

8. An apparatus as defined in claim 7 wherein the output signal from said comparing means comprises a first gating signal, means for providing a second gating signal, said first and second gating signals cooperating to advance said cycle creating means from said referencing step to its next step.

9. An apparatus as defined in claim 7 including means for multiplying said second signal by a factor to get a predetermined value of said second signal, means for adding said predetermined value of said second signal to said first signal whereby said third signal is generated.

10. An apparatus as defined in claim 6 including a decoder and a multiplier, and said means for creating said cycle and said multiplier are operative to multiply the value of said second signal by at least $(+1)$, $(0)$, $(-1)$ and $(0)$ respectively during said steps of said cycle so that when said second signal is summed with said first signal it is respectively, added, ignored, subtracted and ignored from said first signal.

11. An apparatus as defined in claim 6 wherein said means for repeating said cycle comprises means for comparing the value of a signal that corresponds to the proportional change of the value of the output signal from said model parameter identifier from a prior time to said given time with the value of a reference signal, and means for enabling said cycle creating means when said proportional change of the value of said output signal is more than the value of said reference signal.

12. An apparatus as defined in claim 8 where said means for repeating said cycle further comprises means for squaring the differences of signals corresponding to the values of said output signals from said model parameter identifiers of the preceeding cycle with the present cycle to get a first group of squared signals, means for squaring the values of said last named signals for said preceeding cycle to get a second group of squared signals, means for summing each of signals in each of said groups of squared signals, means for dividing the sum of said first group of signals by the sum of said second group of signals to provide said proportional change signal, so that said signal that corresponds to the proportional change of the value of the output signal from said model parameter identifier from a previous time to said given time is obtained.

* * * * *

UNITED STATES PATENT AND TRADEMARK OFFICE
CERTIFICATE OF CORRECTION

PATENT NO. : 4,368,510

DATED : January 11, 1983

INVENTOR(S) : Paul Anderson

It is certified that error appears in the above-identified patent and that said Letters Patent are hereby corrected as shown below:

Column 3, Line 14; change "as" to --at--.

In The Claims:

Claim 2, Line 5; change "a" to --at--;

Line 10; after "said" (first occurrence) insert --second--.

Claim 8, lines 5 and 6; cancel "from said reference step".

Signed and Sealed this

Twelfth Day of July 1983

[SEAL]

Attest:

Attesting Officer

GERALD J. MOSSINGHOFF

Commissioner of Patents and Trademarks